United States Patent

[11] 3,607,795

| [72] | Inventors | Ernst Nolken<br>Frankfurt am Main;<br>Hans Dexheimer, Kelkheim, Taunus, both of Germany |
|---|---|---|
| [21] | Appl. No. | 792,165 |
| [22] | Filed | Jan. 17, 1969 |
| [45] | Patented | Sept. 21, 1971 |
| [73] | Assignee | Farbwerke Hoechst Aktiengesellschaft vormals Meister Lucius & Bruning Frankfurt am Main, Germany |
| [32] | Priority | Jan. 22, 1968 |
| [33] | | Germany |
| [31] | | P 17 20 775.9 |

[54] CELLULAR PLASTICS OF EPOXY RESINS AND PROCESS FOR THEIR MANUFACTURE
6 Claims, No Drawings

[52] U.S. Cl. ................................................. 260/2.5 EP, 260/2 EP, 260/47 EC, 260/835
[51] Int. Cl. ..................................................... C08g 53/10
[50] Field of Search ........................................... 260/2.5 EP, 2 EP:47 EC, 835

[56] References Cited
UNITED STATES PATENTS

| 3,051,665 | 8/1962 | Wismer et al. ................. | 260/2.5 EP |
|---|---|---|---|
| 3,477,966 | 11/1969 | Doss ............................. | 260/2.5 EP |

FOREIGN PATENTS

| 682,879 | 3/1964 | Canada ......................... | 260/2.5 EP |

*Primary Examiner*—John C. Bleutge
*Attorney*—Curtis, Morris & Safford

ABSTRACT: A process for foaming and hardening an epoxy resin or mixtures of an epoxy resin with a lactone or a cyclic ether under the action of inert readily /volatile organic solvents as foaming agents and a mixture of a Lewis acid with phosphoric acid and/or a phosphoric acid derivative containing at least one POP group.

CELLULAR PLASTICS OF EPOXY RESINS AND PROCESS FOR THEIR MANUFACTURE

The present invention relates to cellular plastics of epoxy resins and a process for their manufacture.

It has been proposed to harden epoxy resins with Lewis acids, for example, boron fluoride, tin tetrachloride, antimony pentachloride and aluminum chloride, or with acids, for example, phosphoric acid and benzene-1,3-disulfonic acid. It has also been proposed to carry out the hardening in the presence of low-boiling solvents as foaming agents to obtain cellular plastics.

Cellular plastics of epoxy resins made by using Lewis acids as catalysts have undesirable properties, for example, shrinking and crack growth. When orthophosphoric acid is used as hardener, cross-linking of the resin is only incomplete so that relatively large proportions of low molecular product can be extracted.

It has furthermore been proposed to copolymerize epoxy resins with cyclic ethers, for example, oxiranes, oxacyclobutane and their derivatives, tetrahydrofurane and lactones. The copolymerization does not, however, yield valuable hardened products when Lewis acids are used as catalysts or phosphoric acid and polyphosphoric acid esters as hardeners.

When making cellular plastics of epoxy resins, the adjustment of the cell structure, that is the controlled manufacture of open-pore or closed-pore foams is beset with particular difficulties.

The present invention provides a process for the manufacture of cellular plastics of epoxy resins by hardening epoxy resins in the presence of inert readily volatile organic solvents as foaming agents, pore regulators and optionally lactones or cyclic ethers, which comprises using as hardener combination mixtures of orthophosphoric acid and/or phosphoric acid derivatives containing at least one POP group with Lewis acids.

The process of the invention enables cellular plastics which do not crack or shrink and have good mechanical properties to be obtained with short times of foaming and hardening. The process of the invention offers the particular advantage that the cell structure of the cellular plastic can be adjusted by the choice of the appropriate phosphoric acid component, that is open-cell or closed-cell cellular plastics can be obtained at will.

By using, for example, orthophosphoric acid, completely open-cell cellular plastics are obtained with short times of foaming and hardening, while pyrophosphoric acid or polyphosphoric acid esters yield closed-cell cellular plastics. In this manner, cellular plastics of optimum properties, depending on the intended use, for heat or sound insulation can be obtained.

By epoxy resins there are meant compounds with more than one epoxy group (and at most 10 epoxy groups) in the molecule. In general, the epoxy resins advantageously contain at most 10 epoxy groups in the molecule. Examples of suitable epoxy resins are reaction products of epichlorhydrin with polyhydric alcohols and particularly with mono- or polynuclear polyvalent phenols. Di- or polyglycidic esters may also be used. It is also possible to use compounds which have been obtained by epoxidation of di- or polyolefins, dienes, cyclic dienes or diolefinically unsaturated carboxylic acid esters. Telomers and cotelomers containing glycide ether groups and/or glycidic ester groups may likewise be used. Advantageously reaction products of 2,2-diphenylol-propane with epichlorhydrin, (diglycide ethers of 4,4'-dioxy-diphenyl-2,2-propane), are used. Because of their better processibility it is advantageous to use epoxy resins with 100 to 300 epoxy equivalents which are liquid at room temperature. It is also possible, however, to use solid epoxy resins or epoxy resins with higher epoxy equivalents provided they can be liquefied by the addition of lactones or cyclic ethers or foaming agents.

For foaming, readily vaporizing halogenated hydrocarbons or hydrocarbons such as, for example, monofluorotrichloromethane, monofluorodichloromethane, 1,2,2-trifluorotrichlorethane, 1,2-dichlorotetrafluorethane, methylene chloride or pentane are added to the epoxy resin in known manner. The foaming agent is advantageously used in amounts within the range of from 5 to 30 percent by weight calculated on the epoxy resin.

To obtain pores which are as uniform as possible pore regulators, for example silicon oils, are preferably used.

As Lewis acids used as catalysts in combination with orthophosphoric acid and/or phosphorus compounds containing POP groups there may be mentioned, for example, boron trifluoride, tin tetrachloride, antimony pentachloride, phosphorus pentafluoride, antimony pentafluoride and their complex compounds with alcohols, phenols, carboxylic acids, ethers, esters, ketones, amines and water, for example, $BF_3$-monohydrate, $BF_3$-dihydrate, $BF_3·2C_2H_5OH$, $BF_3\times O(C_2H_5)_2$, $BF_3\times 2_3COOH$, $BF_3 \times$ aniline, $BF_3 \times$ piperidine, $BF_3 \times$ o-chloraniline, $SnCl_4\times 2O(C_2H_5)_2$, $SnCl_4\times 2H_2O$, $PF_5 \times$ tetrahydrofurane or hydroxyboron fluorides, for example dihydroxy-difluohydroboric acid.

The ratio between the phosphoric acid component and the Lewis acid may vary within wide limits. It is, for example, possible to use equal weights of phosphoric acid component and Lewis acid or an excess amount of phosphorus compound. It is suitable not to use less than 1 part by weight Lewis acid for each 50 parts by weight phosphoric acid. Advantageously 2 to 10 parts by weight phosphorus compound are used for each part by weight Lewis acid. The amount of Lewis acid is 0.01 to 5 or 0.1 to 3 mol. percent calculated on the average epoxy equivalent of the resin used.

As phosphorus compounds there are used orthophosphoric acid and/or phosphoric acid derivatives containing POP groups, for example, di-, tri-, tetra-, penta- or polyphosphoric acid, tetraalkyldiphosphoric acid, pentaalkyltriphosphoric acid, hexaalkyltetraphosphoric acid, metaphosphoric acid alkyl esters as they are obtained by the reaction of trialkyl phosphates with phosphorus pentoxide in the appropriate quantitative proportions. It is also possible to use acid polyphosphoric acid esters of di-, tri-, tetra- or pentaphosphoric acid obtained by the reaction of phosphoric acid mono- or diesters with $P_2O_5$ or of phosphoric acid mono-, di- or trialkyl esters with polyphosphoric acid which is easier treat than $P_2O_5$. Besides the alkyl esters of the above polyphosphoric acid derivatives, the alkyl groups of which advantageously have one to 10 carbon atoms and may be linear or branched and substituted by halogen there may also be used aryl esters, for example, phenyl-, methylphenyl-, chlorophenyl- and 1,3,5-tribromophenyl esters. It is also possible to use reaction products of neutral or acid polyphosphoric acid esters with aliphatic or cycloaliphatic diols, triols, polyether diols, polyvalent phenols, for example 4,4'-dioxydiphenylmethane or 4,4'-dioxydiphenyl-2,2-propane. As components containing POP groups there may also be used acid or neutral di-, tri-, tetra- or polyphosphonic acid esters and mixtures of polyphosphonic and polyphosphoric acids.

The above phosphorus compounds of the hardener combination may be used in amounts up to the equivalent amounts calculated on the epoxy resin, that is one hydroxyl equivalent of the phosphorus compound for one epoxy equivalent. With a view to the properties of the cellular plastics it has proved advantageous, however, to use smaller amounts than the equivalent amounts of the above phosphorus compounds, preferably 0.2 to 0.6 hydroxyl equivalents, for each epoxy equivalent.

For making the cellular plastic the mixture of epoxy resin, foaming agent and pore regulator is stirred with the hardening component. Alternatively, the hardener to which the pore regulator and the foaming agent have been added may be admixed with the liquid epoxy resin. Mixing may be carried out in batches with the help of appropriate stirrers or continuously on foaming machines, injection or mixing processes being used for foaming in given molds. The pot life of the foam mixture depends on the epoxy resin used, the catalyst and the chosen initial temperature of the individual components. Foaming is generally terminated after 10 to 30 seconds and the foam is nonadhesive after 20 seconds up to a few minutes.

In addition to foaming agents and pore regulators there may be added fillers, dyestuffs, plasticizers or fire-retarding agents to the mixture to be foamed.

Foam formation sets in at room temperature during the addition of the mixture of phosphorus compound and Lewis acid to the epoxy resin containing the foaming agent and the pore regulator. The components to be mixed with one another may have the same or different temperatures of, for example, 5° to 45°C., preferably 10° to 35°C.

The hardener combination in accordance with the invention may also be used for the hardening with simultaneous foaming of mixtures of epoxy resins with reactive comonomers such as, for example, lactones or cyclic ethers. It is particularly advantageous to use the reactive comonomer as solvent for the hardener combination. Examples of suitable compounds are $g$-caprolactone, $s$-propiolactone, 3-methyl-$s$-propiolactone, 4-methyl-$s$-propiolactone, 3,3-dimethyl-$s$-propiolactone, 4-trichloromethyl-$s$-propiolactone, 4,4-bis-(trichloromethyl)-propiolactone, $d$-butyrolactone, $f$-valerolactone, 2-methyl-$f$-valerolactone, monomethyl-, monoethyl-, monopropyl-, monoisopropyl- etc. up to monododecyl-$g$-caprolactone, dialkyl-$g$-caprolactones in which the two alkyl groups are linked to the same or different carbon atoms, but are not both linked to the $g$-carbon atom, trialkyl-$g$-caprolactones in which two or three carbon atoms in the lactone ring are substituted, alkoxy-$g$-caprolactones, for example, methoxy- and ethoxy-$g$-caprolactones, cycloalkyl-, aryl- or aralkyl-$g$-caprolactones, for example, cyclohexyl-, phenyl- or benzyl-$g$-caprolactones. Lactones with more than 6 carbon atoms in the ring, for example, $h$-enatolactone and $j$-caprilactone may also be used.

As reactive solvents for the hardener combination there may also be used cyclic ethers, for example, propylene oxide, epichlorhydrin, phenyglycide ether, oxacyclobutane, 3-methyl-oxacyclobutane, 3,3-dimethyl-oxacyclobutane, 3,3-bis-(chloromethyl)-oxacyclobutane, 3-ethyl-3-oxymethyl-oxacyclobutane and tetrahydrofurane.

$g$-Caprolactone has proved to be the most advantageous reactive solvent.

The lactones or cyclic ethers are used in amounts within the range of from 1 to 50 percent by weight and 1 to 20 percent by weight, respectively, calculated on the epoxy resin used.

The process of the invention is carried out such that the Lewis acid, for example boron trifluoride etherate, is added to the orthophosphoric acid, the mixture of orthophosphoric acid with di- or polyphosphoric acid or the polyphosphoric acid or the esters thereof and then heated, for example, to 80° C. or to a higher temperature to bring about a recomplexing of the boron fluoride etherate with the OH groups of the phosphorus compound. It is also possible, however, to introduce directly gaseous boron triflouride into the phosphoric acid component until the desired concentration has been reached or to add the Lewis acid in the form of a phosphoric acid complex compound thereof, for example $H_4P_2O_7x2BF_3$, to the phosphoric acid component. The hardener combination is then cooled, if desired after the addition of a reactive solvent, and then used for hardening and foaming the epoxy resin.

It is also possible first to polymerize hardener combination solutions containing a reactive solvent to obtain a low molecular weight prepolymer and then to use the latter for foaming. The cellular plastics in accordance with the invention may be used, for example, as packaging materials, in sandwich constructions and as insulating materials against cold, heat, sound and impact and in the field of electrical engineering. They are distinguished by an extremely good adhesion to materials such as steel, aluminum, cardboard, stone, ceramics and plastics.

The following examples serve to illustrate the invention, but are not intended to limit it, the parts being by weight. The epoxy resin used is a diglycide ether of 4,4.-dioxy-diphenyl-2,2-propane having an epoxy equivalent of 190 and a viscosity of 11,800 cp. at 25°C. As silicone oil a commercial product of UCC designated L 531 was used.

EXAMPLE 1

One hundred parts epoxy resin were mixed with 1 part silicone oil and 15 parts trichlorofluoromethane. The resulting mixture was then mixed with a solution of 10 parts orthophosphoric acid and 1 part $BF_3 \times 0(C_2H_5)_2$ in 20 parts ε-caprolactone within 30 seconds with an impeller at a temperature of 25°C. The mixture to be foamed was introduced into a mold. Within one minute the foam had reached its full height and had become nonadhesive. An open-cell colorless cellular plastic which was homogeneous in the interior and had a density of 35 g./l. and a compressive strength of 2.3 kg./cm.2 was obtained.

EXAMPLE 2

One hundred parts epoxy resin were mixed with 1 part silicone oil and 15 parts trichlorofluoromethane. The resulting mixture was mixed with a solution of 5 parts orthophosphoric acid/diphosphoric acid in a weight ratio of 1:1 and 1 part $BF_3xO(C_2H_5)_2$ in 10 parts ε-caprolactone within 8 seconds with an impeller. A cellular plastic with 76.5 percent of closed cells and which was homogeneous inside and had a good resistance to shearing and compression and a density of 34.5 g/1 was obtained.

EXAMPLE 3

One hundred parts epoxy resin were mixed with 1 part silicone oil and 15 parts trichlorofluoromethane. 3.5 Parts diphosphoric acid were then heated to 80° C. with 1 part $BF_3xO(C_2H_5)_2$, cooled, dissolved in 15 parts ε-caprolactone and the resulting solution was mixed within 30 seconds, with stirring, with the mixture of resin, pore regulator and foaming agent. After 1.5 minutes the foam had reached its full height in the mould and was non-adhesive. An 80 percent closed-pore cellular plastic of a density of 37.2 g/1 was obtained.

EXAMPLE 4

One hundred parts epoxy resin were mixed with 1 part silicone oil and 15 parts trichlorofluoromethane. Then a solution of 0.8 gram $BF_3x$ o-chloraniline in 10 parts polyphosphoric acid hexyl ester which had been obtained by the reaction of 7 parts phosphoric acid-di-$n$-hexyl ester with 3 parts phosphorus pentoxide was added in 18 seconds while stirring. After introduction into the mould, the foam had reached its full height within 1 minute and had become non-adhesive. A hard tough cellular plastic with 79 percent of closed cells and having a density of 34.4 g/1 was obtained.

EXAMPLE 5

A mixture of 100 parts epoxy resin, 1 part silicone oil and 15 parts trichlorofluoromethane was mixed within 30 seconds, while stirring, with a mixture of 10.4 parts orthophosphoric acid, 5.4 parts γ-butyrolactone and 0.2 part $BF_3xO(C_2H_5)_2$ and introduced into a mold. Within 30 seconds the cellular plastic had reached its full height and had become nonadhesive. A completely open-cell, fine-pore colorless and hard cellular plastic which was homogeneous inside and had a density of 30 g./1. was obtained.

EXAMPLE 6

A mixture of 100 parts epoxy resin, 1 part silicone oil and 15 parts trichlorofluoromethane was mixed within 45 seconds, while stirring, with a mixture of 7 parts orthophosphoric acid, 10 parts 3,3-bis-(chloromethyl)-oxacylcobutane and 0.2 part $BF_3 \times 0(CH_5)_2$. A fine-pore cellular plastic which was homogeneous inside and had a density of 40 g./1. was obtained.

What is claimed is:

1. In a process for the manufacture of a cellular plastic of an epoxy resin in the presence of an inert, readily volatilizing organic solvent as a foaming agent, a pore regulator, and additionally, a lactone or a cyclic ether, the improvement of which comprises adding to said epoxy resin as a hardener therefor a mixture of a and b wherein a is orthophosphoric acid or a phosphoric acid or orthophosphoric acid in admixture with a phosphoric acid in an amount from 0.2 to 0.6 hydroxy equivalents of said acid to each epoxy equivalent of said resin and b is a Lewis acid in an amount from 0.1 to 3 mole percent calculated on the average epoxy equivalent of said resin and wherein a is orthophosphoric acid, diphosphoric acid, triphosphoric acid, tetraphosphoric acid, pentaphosphoric acid, polyphosphoric acid, tetraalkyl diphosphoric acid, pentaalkyl triphosphoric acid, hexaalkyl tetraphosphoric acid, metaphosphoric acid alkyl esters, wherein said alkyl groups are from one to 10 carbon atoms and may be substituted by halogen, a reaction product of phosphoric acid mono-, di- or trialkyl esters with polyphosphoric acid, acid polyphosphoric acid alkyl or aryl esters of di-, tri-, tetra-, or pentaphosphoric acid, wherein said alkyl groups are as defined above; aryl esters of said phosphoric acid esters wherein the aryl ester group is a phenyl-, methylphenyl-, chlorophenyl-, or 1,3,5-tribromophenyl ester group; a neutral or a polyphosphoric acid ester of resorcinol, 4,4'-dioxydiphenyl-methane or 4,4'-dioxydiphenyl-2,2-propane; and wherein b is boron trifluoride, tintetrachloride, antimonypentachloride, phosphorus pentafluoride, antimonypentafluoride, $BF_3$-monohydrate, $BF_3$-dihydrate, a hydroxy boron fluoride, $BF_3 \cdot 2 CH_2H_5OH$, $BF_3 \cdot O(C_2H_5)_2$, $BF_3 \cdot 2CH_3COOH$, $BF_3 \cdot$aniline, $BF_3 \cdot$piperidine, $BF_3 \cdot$o-chloroaniline, $SnCl_4 \cdot 20(C_2H_5)_2$, $SnCl_4 \cdot 2H_2O$ or $PF_5$ tetrahydrofurane; and foaming and hardening said resin to obtain said cellular plastic.

2. The process of claim 1 wherein the lactone or cyclic ether is used as solvent for the hardener combination.

3. The process of claim 1 wherein the lactone is $\epsilon$-caprolactone.

4. The process of claim 1 wherein the epoxy resin is a diglycide ether of 4,4'-dioxy-diphenyl-2,2-propane.

5. The process of claim 1 wherein the Lewis acid is boron trifluoride.

6. The process as defined in claim 1 and wherein the a component is orthophosphoric acid and the b component is boron trifluoride